(12) United States Patent
Hall et al.

(10) Patent No.: US 8,698,013 B1
(45) Date of Patent: Apr. 15, 2014

(54) FEED WEIGHING INSERT ASSEMBLY

(76) Inventors: James C. Hall, Shreveport, LA (US); James F. Hall, Jr., Shreveport, LA (US)

( * ) Notice: Subject to any disclaimer, the term of this patent is extended or adjusted under 35 U.S.C. 154(b) by 514 days.

(21) Appl. No.: 12/931,397

(22) Filed: Jan. 31, 2011

(51) Int. Cl.
- *A01K 1/10* (2006.01)
- *A01M 31/00* (2006.01)
- *G01G 21/28* (2006.01)
- *G01G 13/00* (2006.01)

(52) U.S. Cl.
USPC ............. 177/126; 43/1; 119/51.01; 119/52.1; 177/116; 177/238; 177/245; 222/77

(58) Field of Classification Search
USPC ............ 119/51.01, 52.1; 177/126, 127, 177/116–122, 238, 244, 245; 222/55, 56, 222/77; 141/83; 43/1
See application file for complete search history.

(56) References Cited

U.S. PATENT DOCUMENTS

| | | |
|---|---|---|
| 3,311,418 A | 3/1967 | Scruby et al. |
| 3,929,277 A | 12/1975 | Byrne et al. |
| 4,049,950 A | 9/1977 | Byrne et al. |
| 4,219,136 A | 8/1980 | Williams et al. |
| 4,345,858 A | 8/1982 | Barlow |
| 4,478,300 A * | 10/1984 | Mikami ........................ 177/59 |
| 4,529,660 A * | 7/1985 | Heim ........................ 428/423.1 |
| 4,683,966 A | 8/1987 | Nakagawa et al. |
| 4,693,355 A * | 9/1987 | Bochi et al. .................... 177/59 |
| 4,811,694 A * | 3/1989 | Holmquist .................. 119/52.2 |
| 4,945,957 A * | 8/1990 | Kardux et al. .................. 141/83 |
| 5,235,325 A * | 8/1993 | McCaughan, Jr. ............ 340/666 |
| 5,379,923 A | 1/1995 | Sagastegui et al. |
| 5,433,171 A * | 7/1995 | Ewell ........................... 119/51.5 |
| 5,641,947 A * | 6/1997 | Riddle, Jr. .................... 177/126 |
| 5,764,522 A * | 6/1998 | Shalev .......................... 700/240 |
| 5,921,369 A * | 7/1999 | Steele ........................ 193/25 R |
| 6,056,027 A | 5/2000 | Patterson |
| 6,111,206 A | 8/2000 | Maguire |
| 6,176,774 B1 * | 1/2001 | Filiberti et al. ................ 453/32 |
| 6,894,232 B2 | 5/2005 | Waggoner et al. |
| 7,312,408 B2 | 12/2007 | Kawanishi et al. |
| 7,683,271 B2 | 3/2010 | Newton |
| 2009/0205876 A1* | 8/2009 | Claypool .................. 177/25.13 |
| 2010/0236838 A1* | 9/2010 | Shrak et al. ....................... 177/1 |

FOREIGN PATENT DOCUMENTS

JP 06-211358 * 8/1994 ............. B65G 65/30

* cited by examiner

*Primary Examiner* — Randy W Gibson
(74) *Attorney, Agent, or Firm* — R. Keith Harrison

(57) ABSTRACT

A feed weighing assembly includes an assembly scale, a display screen interfacing with the assembly scale and an insert body carried by the assembly scale and sized and configured for placement in a game feeder.

12 Claims, 8 Drawing Sheets

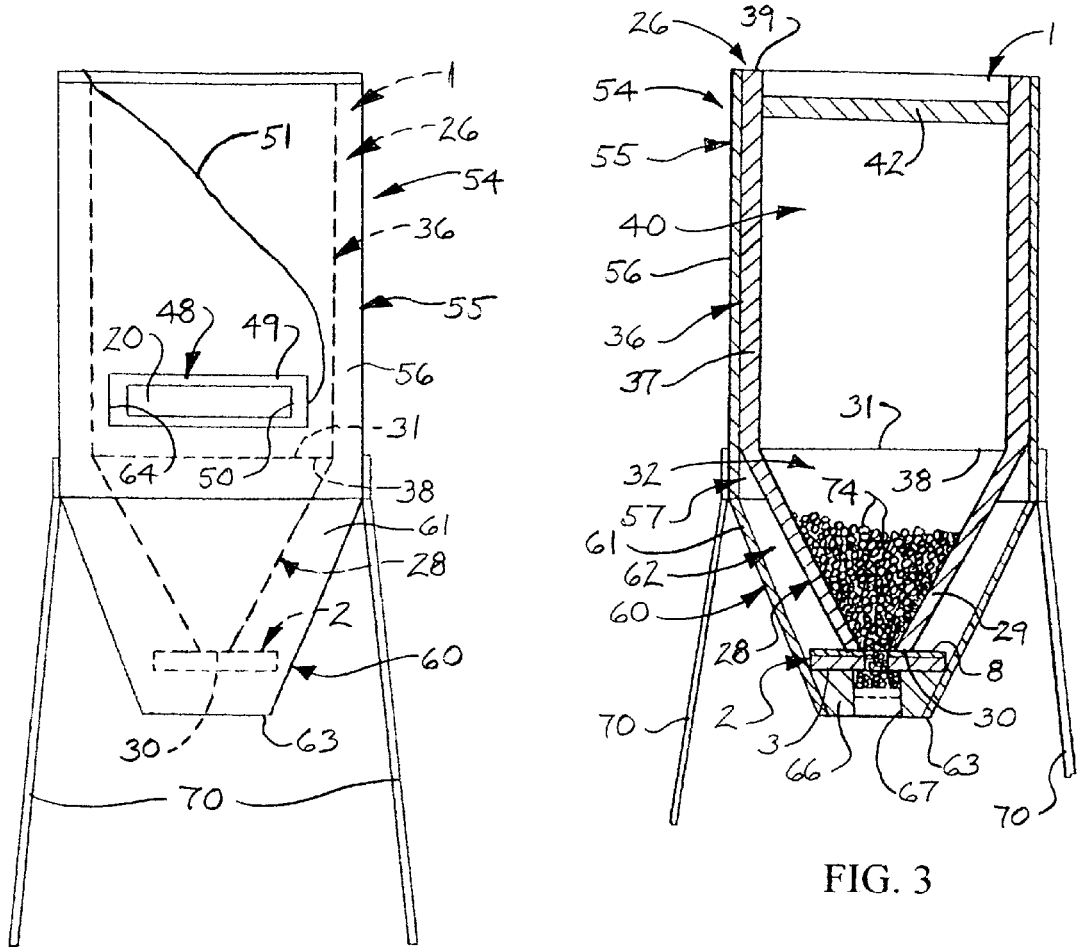
FIG. 2
FIG. 3
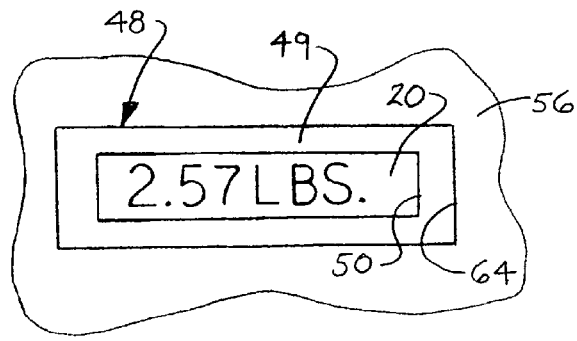
FIG. 4

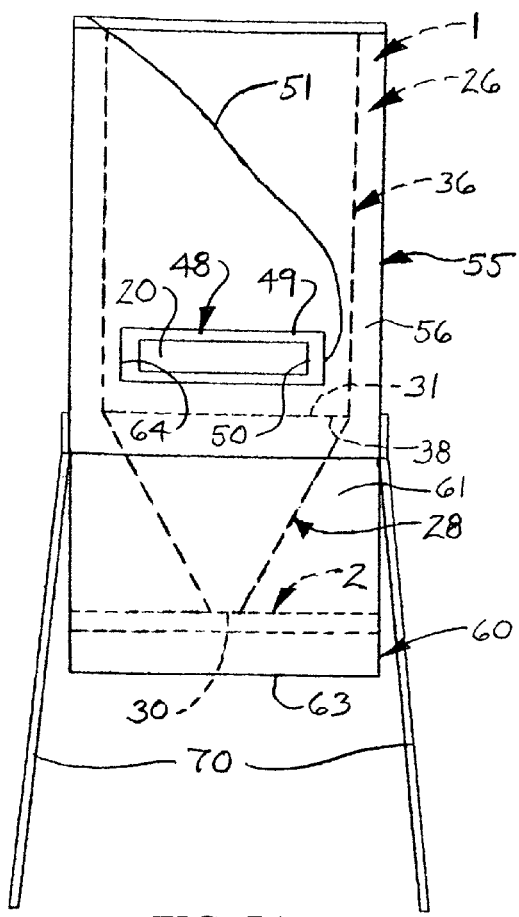
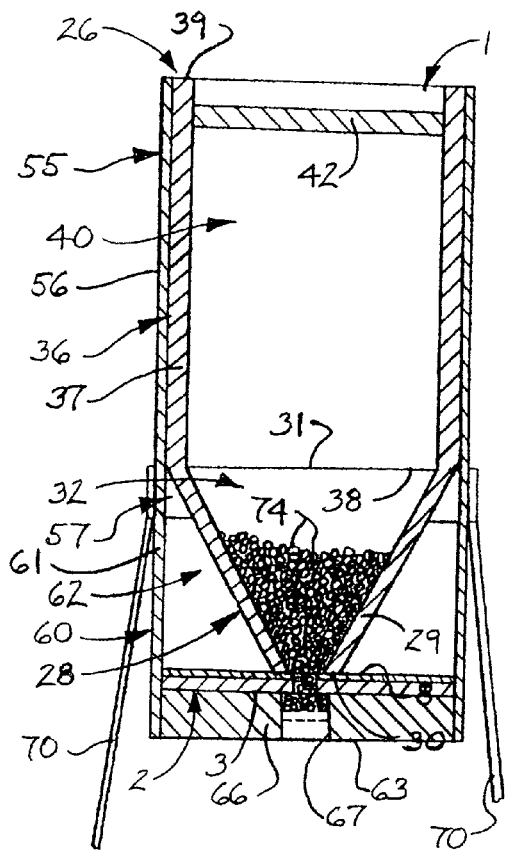
FIG. 7A
FIG. 7B
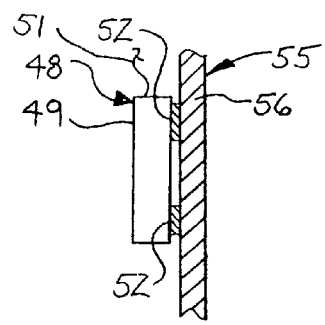
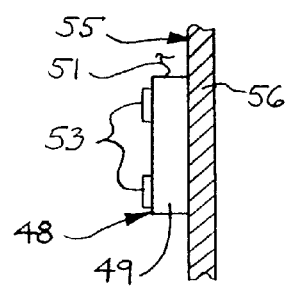
FIG. 7C
FIG. 7D

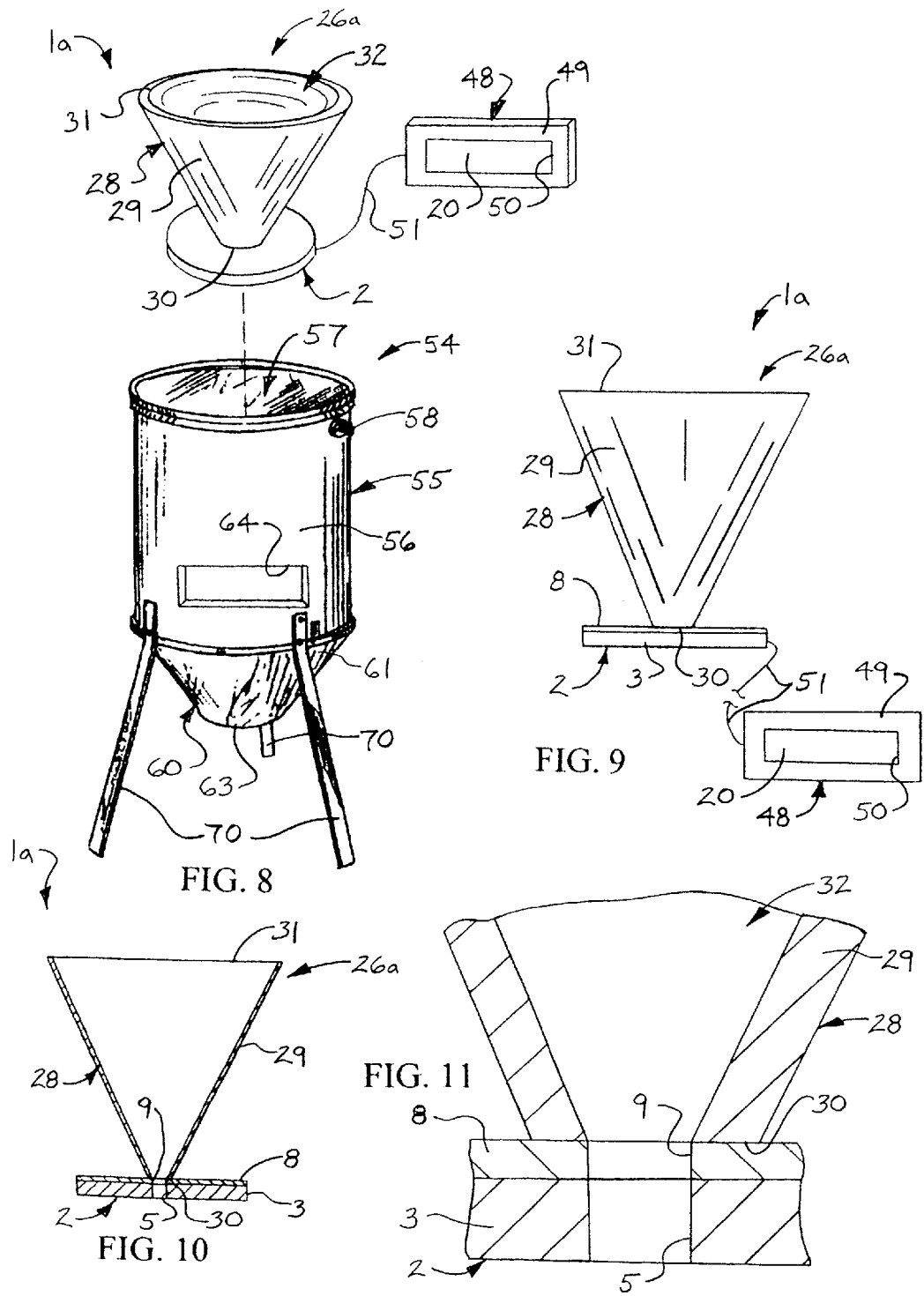

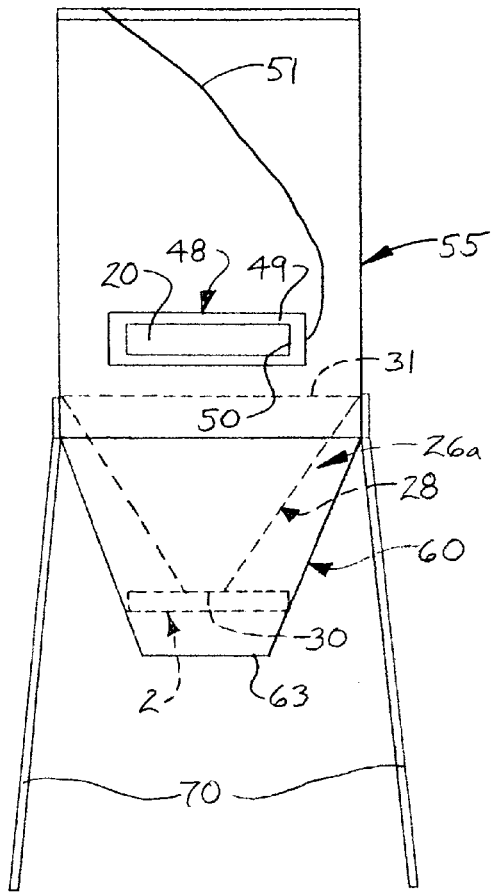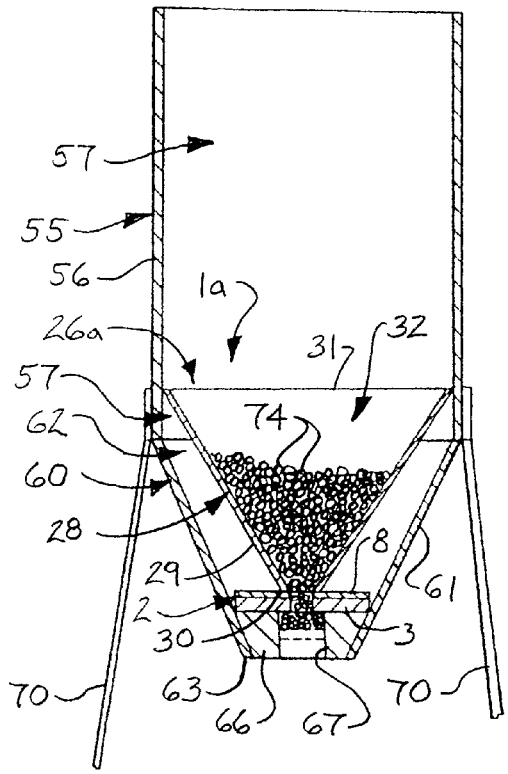
FIG. 12
FIG. 13
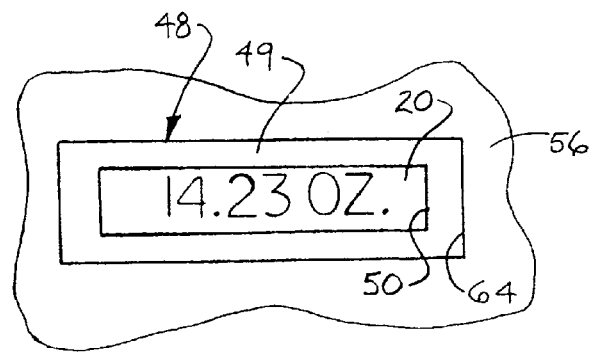
FIG. 14

FEED WEIGHING INSERT ASSEMBLY

FIELD

The disclosure generally relates to game feeders. More particularly, the disclosure relates to a feed weighing insert assembly which weighs and displays the weight of feed pellets in a game feeder.

BACKGROUND

Game feeders are frequently used by hunters or observers of game such as deer to attract game to a selected area for hunting or observation. A conventional game feeder may include a generally cylindrical feed receptacle having a receptacle interior for containing feed pellets. The feed receptacle may be fitted with tripod legs which are adapted to support the feed receptacle above the ground. A funnel-shaped feed dispensing hopper extends from the bottom of the feed receptacle and is fitted with an interior feed dispensing mechanism to control or meter the quantity of feed pellets dispensed from the feed dispensing hopper onto the ground. The feed dispensing mechanism may include a timer which can be set to periodically dispense the feed pellets from the feed receptacle and feed dispensing hopper onto the ground at timed intervals. A removable lid may be placed on the feed receptacle after placement of the feed pellets in the feed receptacle. The quantity of feed pellets which remain in the feed receptacle may be periodically checked by removing the lid from the feed receptacle.

In -some applications, a game feeder may be suspended over the ground from a tree limb or other elevated support. Periodically checking the quantity of feed pellets which remain in the feed receptacle and feed dispensing hopper may be cumbersome since the person checking the feed pellet supply may need to position a ladder next to the feeder before removing the lid from the feeder to observe the quantity of feed pellets remaining in the feed receptacle. This procedure may additionally create a safety concern as the person checking the feed pellet typically supply must balance himself or herself on a ladder adjacent to the feeder.

Therefore, a feed weighing insert assembly which weighs and displays the weight of feed pellets in a game feeder is needed.

SUMMARY

The disclosure is generally directed to a feed weighing assembly which weighs and displays the weight of feed pellets in a game feeder. An illustrative embodiment of the feed weighing assembly includes an assembly scale, a display screen interfacing with the assembly scale and an insert body carried by the assembly scale and sized and configured for placement in a game feeder.

BRIEF DESCRIPTION OF THE DRAWINGS

The disclosure will now be made, by way of example, with reference to the accompanying drawings, in which:

FIG. 2 is a front view of a game feeder having a funnel-shaped feed dispensing hopper, with an illustrative embodiment of the feed weighing insert assembly (illustrated in phantom) inserted in the game feeder;

FIG. 3 is a longitudinal sectional view of the game feeder illustrated in FIG. 2, with an illustrative embodiment of the feed weighing insert assembly (illustrated in section) inserted in the game feeder;

FIG. 4 is a front view of a display unit of an illustrative embodiment of the feed weighing insert assembly, provided on an exterior surface of the game feeder (illustrated in section);

FIG. 7A is a front view of a game feeder having a cylindrical feed dispensing hopper, with an illustrative embodiment of the feed weighing insert assembly (illustrated in phantom) of FIGS. 1-7 inserted in the game feeder;

FIG. 7B is a longitudinal sectional view of the game feeder illustrated in FIG. 7A, with an illustrative embodiment of the feed weighing insert assembly (illustrated in section) of FIGS. 1-7 inserted in the game feeder;

FIG. 7C is a sectional view of a portion of the feed receptacle wall of the feed receptacle, more particularly illustrating an exemplary magnet technique for attaching the display unit to the exterior of the feed receptacle;

FIG. 7D is sectional view of a portion of the feed receptacle wall of the feed receptacle, more particularly illustrating an exemplary fastener technique for attaching the display unit to the exterior of the feed receptacle;

FIG. 8 is an exploded perspective view of an alternative illustrative embodiment of the feed weighing insert assembly, more particularly illustrating placement of the assembly in a game feeder in exemplary application of the assembly;

FIG. 9 is a side view, partially in section, of the illustrative embodiment of the feed weighing insert assembly illustrated in FIG. 8;

FIG. 10 is a sectional view of assembly scale and insert hopper components of the illustrative embodiment of the feed weighing insert assembly illustrated in FIG. 8;

FIG. 11 is an enlarged sectional view of the assembly scale and insert hopper components of the illustrative embodiment of the feed weighing insert assembly illustrated in FIG. 8;

FIG. 12 is a front view of a game feeder having a funnel-shaped feed dispensing hopper, with the illustrative embodiment of the feed weighing insert assembly (illustrated in phantom) of FIG. 8 inserted in the game feeder;

FIG. 13 is a longitudinal sectional view of the game feeder illustrated in FIG. 12, with the illustrative embodiment of the feed weighing insert assembly of FIG. 8 (illustrated in section) inserted in the game feeder;

FIG. 14 is a front view of a display unit of the illustrative embodiment of the feed weighing insert assembly illustrated in FIG. 8, provided on an exterior surface of the game feeder (illustrated in section);

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
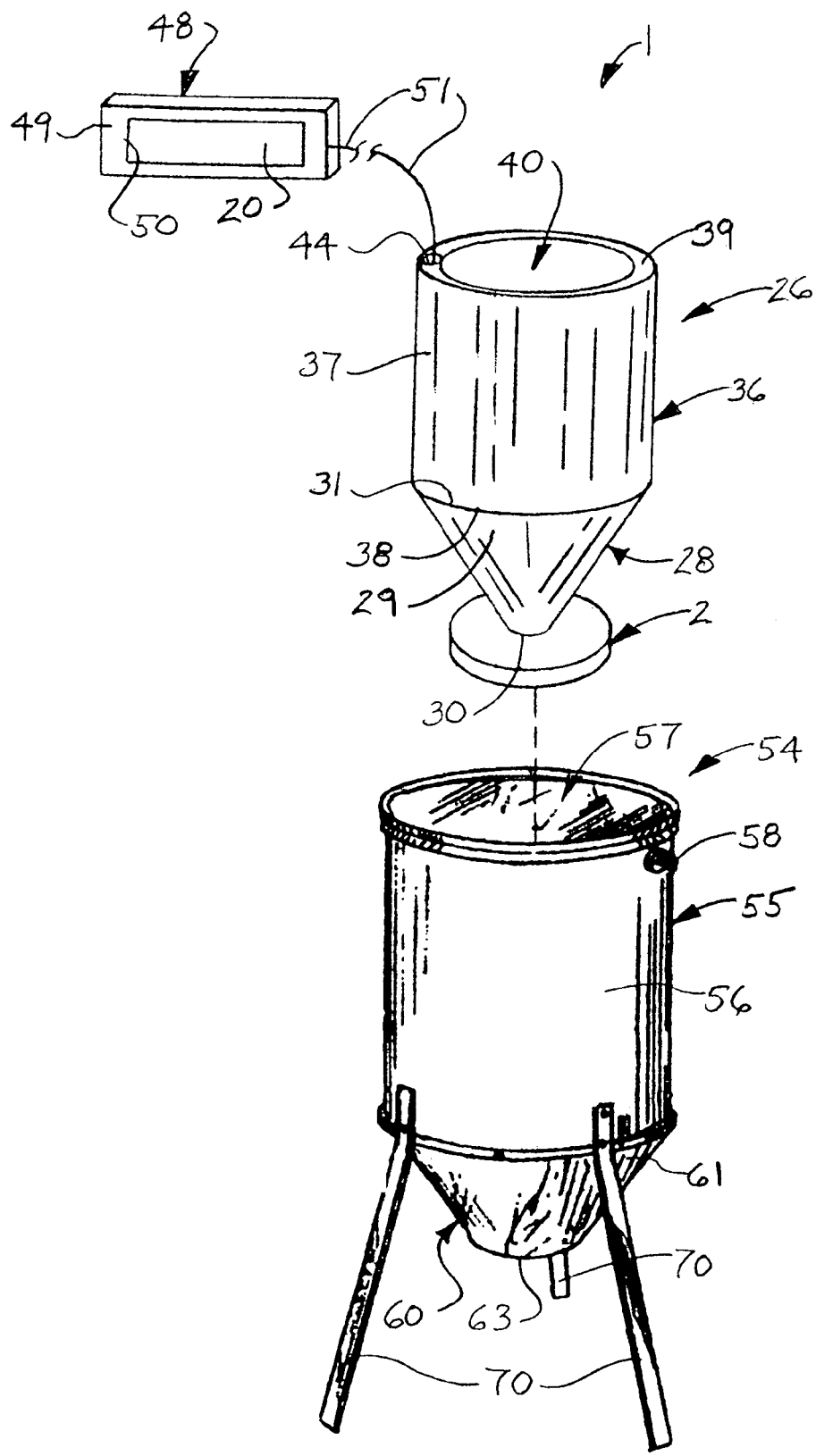
FIG. 1 is an exploded perspective view (partially in section) of an illustrative embodiment of the feed weighing insert assembly, more particularly illustrating placement of the assembly in a game feeder in exemplary application of the assembly.

Referring initially to FIGS. 1-7 of the drawings, an illustrative embodiment of the feed weighing insert assembly, hereinafter assembly, is generally indicated by reference numeral 1. The assembly 1 may include an assembly scale 2 and an insert body 26 provided on the assembly scale 2. As illustrated in FIG. 1 and will be hereinafter described, in exemplary application, the assembly 1 is inserted in a game feeder 54 which may be conventional. A supply of game feed pellets 74 (FIG. 3) is placed in the insert body 26 of the assembly 1. The assembly scale 2 is adapted to weigh the game feed pellets 74 and indicate the measured weight of the game feed pellets 74 which are in the insert body 26 on the exterior of the game feeder 54. The measured weight of the game feed pellets 74 in the insert body 26, displayed on the exterior of the game feeder 54, enables a user of the game feeder 54 to determine whether addition of game feed pellets 74 to the game feeder 54 is necessary for initial or continued use of the game feeder 54 in hunting or observing game or the like.

Figure 5:
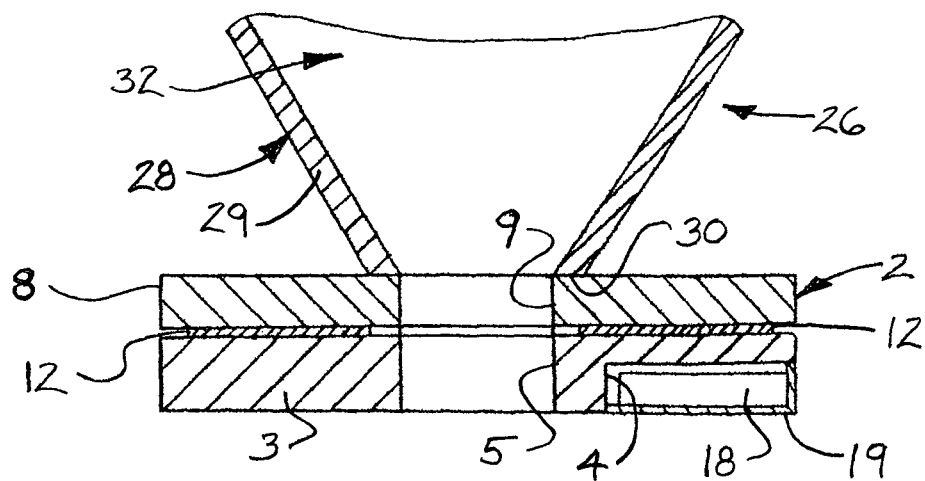
FIG. 5 is a sectional view of an assembly scale and an insert hopper of an illustrative embodiment of the feed weighing insert assembly.

The assembly scale 2 of the assembly 1 may have any design which is suitable for the purpose of weighing the supply of game feed pellets 74 placed in the insert body 26. As illustrated in FIG. 5, in some embodiments, the assembly scale 2 may include an assembly scale base 3. The assembly scale base 3 may have a base interior 4 which is sized and configured to contain some of the various functional components of the assembly scale 2 which will be hereinafter described. The assembly scale base 3 may have a central scale base opening 5. A scale plate 8 may be provided on the assembly scale base 3. The scale plate 8 may have a central scale plate opening 9 which registers with the scale base opening 5 of the assembly scale base 3. At least one weight sensor 12 may be interposed between the assembly scale base 3 and the scale plate 8. Accordingly, the scale plate 8 may be movable with respect to the assembly scale base 3 in such a manner that the weight sensor or weight sensors 12 is/are compressed between the assembly scale base 3 and the scale plate 8 and are capable of measuring the weight of any load which is exerted on the scale plate 8 as will be hereinafter described.

Figure 6:
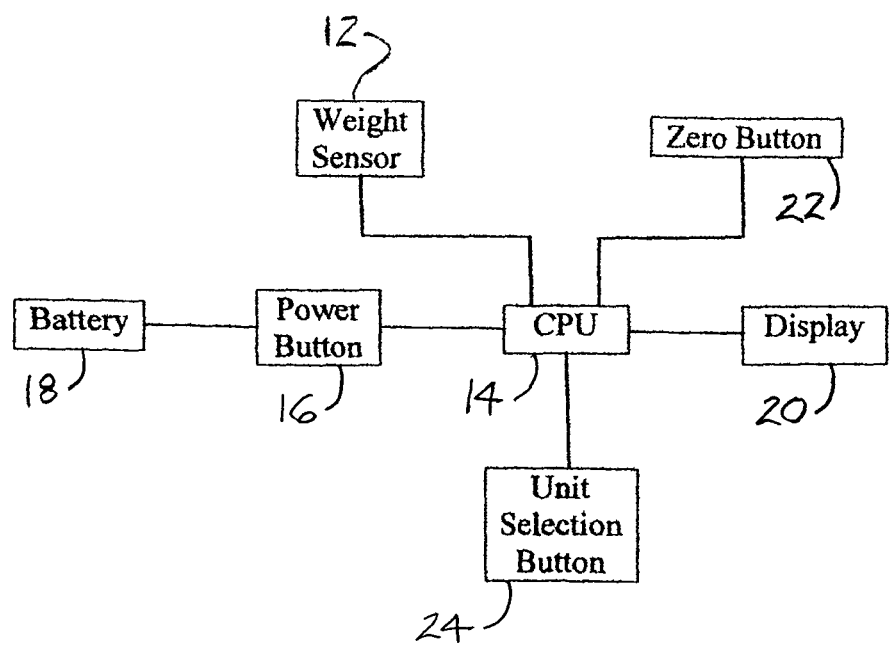
FIG. 6 is a block diagram illustrating exemplary interfacing of functional components according to an illustrative embodiment of the feed weighing insert assembly.

Some of the exemplary functional components of the assembly scale 2 are illustrated in FIG. 6. Each weight sensor 12 may interface with a CPU (Central Processing Unit) 14. A power button 16 may interface with the CPU 14. At least one battery 18 may electrically interface with the CPU 14 through the power button 16. A display screen 20 may interface with the CPU 14. The display screen 20 may be adapted to display the weight of the load which is exerted on the scale plate 2 in ounces, pounds, kilograms and/or other weight units in a digital or other format. Accordingly, electrical power from the battery 18 may be supplied to the CPU 14 by manipulation of the power button 16 to an "ON" position. As it measures the weight of the load which is applied to the scale plate 8, the weight sensor 12 transmits a weight signal which is indicative of the weight of the load to the CPU 14. The CPU 14 indicates the measured weight of the load on the display screen 20. The power button 16 may be provided in any accessible location on the assembly scale 2 or the insert body 26 of the assembly 1. As illustrated in FIG. 5, the battery 18 and other functional components of the assembly scale 2 may be contained in the base interior 4 of the assembly scale base 3. A detachable access cover 19 may be provided on the assembly scale base 3 to selectively open and close the base interior 4.

As further illustrated in FIG. 6, in some embodiments, a zero button 22 may interface with the CPU 14. The zero button 22 may be adapted to "zero" or clear the weight of the load which is applied to the scale plate 8 and displayed on the display screen 20. In some embodiments, a weight unit selection button 24 may interface with the CPU 14. The weight unit selection button 24 may be adapted to facilitate selection of the weight units in which the weight of the load applied to the scale plate 8 of the assembly scale 2 is indicated on the display screen 20. For example and without limitation, in some embodiments, the weight unit selection button 24 may be adapted to facilitate selection between pounds and ounces indicated on the display screen 20. The zero button 22 and the weight unit selection button 24 may be provided in any accessible location on the assembly scale 2 or the insert body 26 of the assembly 1.

The display screen 20 may be connected to the CPU 14 through display unit wiring 51. As illustrated in FIG. 1, in some embodiments, the display screen 20 may be part of a display unit 48 having a display unit housing 49 which receives the display screen 20. The display screen 20 may be visible through a housing opening or window 50 in the display unit housing 49.

Figure 7:
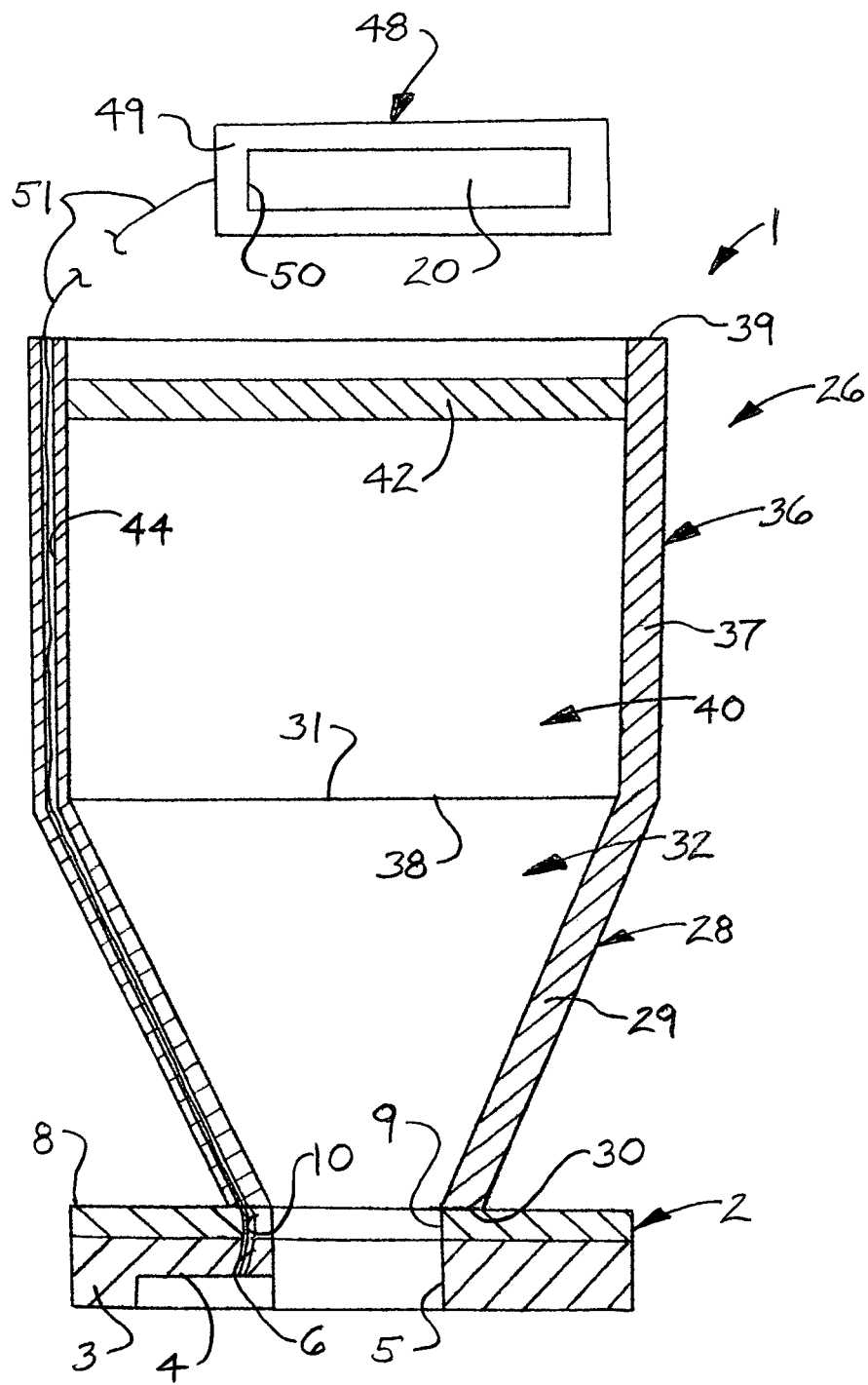
FIG. 7 is a longitudinal sectional view of an illustrative embodiment of the feed weighing insert assembly.

As illustrated in FIG. 7, the insert body 26 of the assembly 1 may include an insert hopper 28 having a generally tapered or funnel-shaped insert hopper wall 29 and an insert hopper interior 32. The insert hopper wall 29 may have an insert hopper bottom edge 30 and an insert hopper top edge 31. The insert hopper bottom edge 30 of the insert hopper wall 29 may rest on the scale plate 8 of the assembly scale 2. In some embodiments, the insert hopper bottom edge 30 may be attached to the scale plate 8 using any suitable fastening technique. In other embodiments, the insert hopper wall 29 of the insert hopper 28 and the scale plate 8 of the assembly scale 2 may be fabricated together in one piece.

The insert body 26 of the assembly 1 may further include an insert receptacle 36 on the insert hopper 28. The insert receptacle 36 may include a generally cylindrical insert receptacle wall 37 which extends from the insert hopper top edge 31 of the insert hopper 28 and has an insert receptacle interior 40 which communicates with the insert hopper interior 32 of the insert hopper 28. The insert receptacle 36 may include an insert receptacle bottom edge 38 which generally corresponds to the insert hopper top edge 31 of the insert hopper 28 and an insert receptacle top edge 39 which is opposite the insert receptacle bottom edge 38. In some embodiments, an insert handle 42 may span the insert receptacle interior 40 generally at the insert receptacle top edge 39.

As further illustrated in FIG. 7, in some embodiments, a wiring conduit 44 may extend through the insert receptacle wall 37 of the insert receptacle 36 and the insert hopper wall 29 of the insert hopper 28 of the insert body 26. A wiring conduit 10 may also be provided in the scale plate 8 and a wiring conduit 6 may be provided in the assembly scale base 3 of the assembly scale 2. The display unit wiring 51 may extend from the display screen 20 in the display unit housing 49 of the display unit 48 and through the wiring conduit 44 in the insert body 26 and the wiring conduit 10 in the scale plate 8 and the wiring conduit 6 in the assembly scale base 3, respectively, and connect to the CPU 14 (FIG. 6) which may be contained in the scale interior 4 of the assembly scale base 3.

Referring next to FIGS. 1-4 and 7A-7D of the drawings, in exemplary application, the assembly 1 is placed in a game feeder 54 to weigh and display the weight of game feed pellets 74 placed in the game feeder 54. The game feeder 54 may have a conventional design with a feed receptacle 55 including a generally elongated, cylindrical feed receptacle wall 56 and a feed receptacle interior 57. A pivoting feeder handle 58 (FIG. 1) may be attached to the exterior surface of the feed receptacle wall 56. As illustrated in FIG. 3, a feed dispensing hopper 60 includes a hopper wall 61 enclosing a hopper interior 62 which communicates with the feed receptacle interior 57 of the feed receptacle 55. In some applications, the hopper wall 61 may be generally tapered or cone-shaped, as illustrated in FIG. 3. In other applications, the hopper wall 61 may be generally cylindrical, as illustrated in FIGS. 7A and 7B. The feed dispensing hopper 60 may include an open-ended hopper bottom 63. In conventional application of the game feeder 54, the feed dispensing hopper 60 and the feed receptacle 55 are adapted to contain a supply of game feed pellets or granules 74 which are to be dispensed from the feed dispensing hopper 60 onto the ground beneath the game feeder 54.

A feed dispensing mechanism 66 may be provided in the hopper interior 62 of the feed dispensing hopper 60. The feed dispensing mechanism 66 may have a feed opening 67. The feed dispensing mechanism 66 is adapted to selectively dispense controlled or metered quantities of the game feed pellets 74 by gravity from the hopper interior 62 through the feed opening 67. The feed dispensing mechanism 66 may conventionally include a timer (not illustrated) which facilitates dispensing of game feed pellets 74 through the feed opening 67 for a selected predetermined period of time, after which the feed dispensing mechanism 66 terminates further dispensing of the feed pellets 74 through the feed opening 67. Tripod feeder legs 70 may extend outwardly from the feed receptacle 55 to support the feed dispensing hopper 60 above the ground (not illustrated).

The assembly 1 is inserted in the feed receptacle interior 57 and the hopper interior 62 of the game feeder 54 with the assembly scale 2 seated in the bottom portion of the feed dispensing hopper 60, generally above the feed dispensing mechanism 66, as illustrated in FIG. 3. The scale base opening 5 and the scale plate opening 9 (FIG. 5) of the assembly scale 2 are aligned with the feed opening 67 of the feed dispensing mechanism 66 (FIG. 3). Prior to placement of the assembly scale 2 and the insert receptacle 36 in the feed receptacle interior 57 and the hopper interior 62, the display unit 48 may be placed on the exterior surface of the feed receptacle wall 56 with the display screen 20 facing outwardly from the feed receptacle wall 56 of the feed receptacle 55, as illustrated in FIG. 4. The display unit 48 may be secured to the exterior surface of the feed receptacle wall 56 using any technique which is suitable for the purpose. For example and without limitation, as illustrated in FIG. 7C, in some embodiments, display unit attachment magnets 52 may be provided on the display unit housing 49 of the display unit 48 for magnetic attachment of the display unit housing 49 to the feed receptacle wall 56. As illustrated in FIG. 7D, in some embodiments, display unit attachment fasteners 53 or alternatively, mating flanges and grooves (not illustrated), for example and without limitation, may be used to secure the display unit 48 to the feed receptacle wall 56.

A supply of game feed pellets 74 (FIG. 3) is placed in the insert hopper interior 32 of the insert hopper 28 and the insert receptacle interior 40 of the insert receptacle 36 of the insert body 26 of the assembly 1. A lid (not illustrated) may be placed on the feed receptacle 55 of the game feeder 54. The assembly scale 2 may be turned on by manipulation of the power button 16 (FIG. 6). The assembly scale 2 weighs the game feed pellets 74 and indicates on the exterior of the game feeder 54 the measured weight of the game feed pellets 74 which are in the insert body 26. The measured weight of the game feed pellets 74 in the insert body 26, displayed on the exterior of the game feeder 54, enables a user of the game feeder 54 to determine whether addition of game feed pellets 74 to the game feeder 54 is necessary for initial or continued use of the game feeder 54. In some applications, the weight of the insert body 26 on the assembly scale 2 may be initially "cleared" or "zeroed" by depression of the zero button 22 (FIG. 6) prior to placement of the game feed pellets 74 in the insert body 26. This facilitates measurement and display of the weight of the game feed pellets 74 on the display screen 20 of the display unit 48 without the weight of the insert body 26. In some applications, the weight unit selection button 24 (FIG. 6) may be depressed to select the weight units in which the weight of the game feed pellets 74 is expressed on the display screen 20. In the example which is illustrated in FIG. 4, the weight of the game feed pellets 74 is indicated on the display screen 20 in lbs. The weight unit selection button 24 may be depressed to alternatively display the weight of the game feed pellets 74 in ounces, grams, kilograms or other selected weight units.

Throughout conventional use of the game feeder 54, the feed dispensing mechanism 66 may periodically dispense game feed pellets 74 through the feed opening 67 (FIG. 3) onto the ground (not illustrated) beneath the feed dispensing hopper 60 under control of the conventional timer mechanism. The dispensed game feed pellets 74 may attract deer or other game to the area of the game feeder 54 for hunting, observational or other purposes. Therefore, the quantity of game feed pellets 74 which remains in the game feeder 54 gradually decreases. However, the display screen 20 of the display unit 48 of the assembly 1 continually indicates the weight of the supply of game feed pellets 74 which remains in the game feeder 54. This capability prevents a user of the game feeder 54 from being required to remove the lid (not illustrated) from the feed receptacle 55 of the game feeder 54 to visually ascertain the quantity of game feed pellets 74 remaining in the game feeder 54. The feed weight display capability of the display unit 48 may be particularly advantageous in applications in which the game feeder 54 is suspended from a tree limb (not illustrated) or other elevated support and visually checking the quantity of game feed pellets 74 remaining in the game feeder 54 would require that a user stand on a ladder or other support (not illustrated). After use, the assembly scale 2 of the assembly 1 may be selectively turned off by manipulation of the power button 16 (FIG. 6). In some embodiments, a timer (not illustrated) may interface with the CPU 14 to automatically turn off the assembly scale 2 after a preset period of time. In some applications, the assembly 1 may be selectively removed from the game feeder 54 as desired.

Referring next to FIGS. 8-14B of the drawings, an alternative illustrative embodiment of the feed weighing insert assembly is generally indicated by reference numeral 1a. The assembly 1a may include an assembly scale 2 which may have a design which is the same as or similar to the design of the assembly scale 2 of the assembly 1 heretofore described with respect to the assembly 1 in FIGS. 1-7. A display screen 20 may be connected to the assembly scale 2 and may be part of a display unit 48 having a display unit housing 49 with a housing opening 50 through which the display screen 20 is visible. An insert body 26a may be provided on the scale plate 8 (FIG. 9) of the assembly scale 2. The insert body 26a may include an insert hopper 28 having a generally funnel-shaped insert hopper wall 29 with an insert hopper bottom edge 30, an insert hopper top edge 31 and an insert hopper interior 32, as was heretofore described with respect to the assembly 1 in FIGS. 1-7.

Figures 14A, 14B:
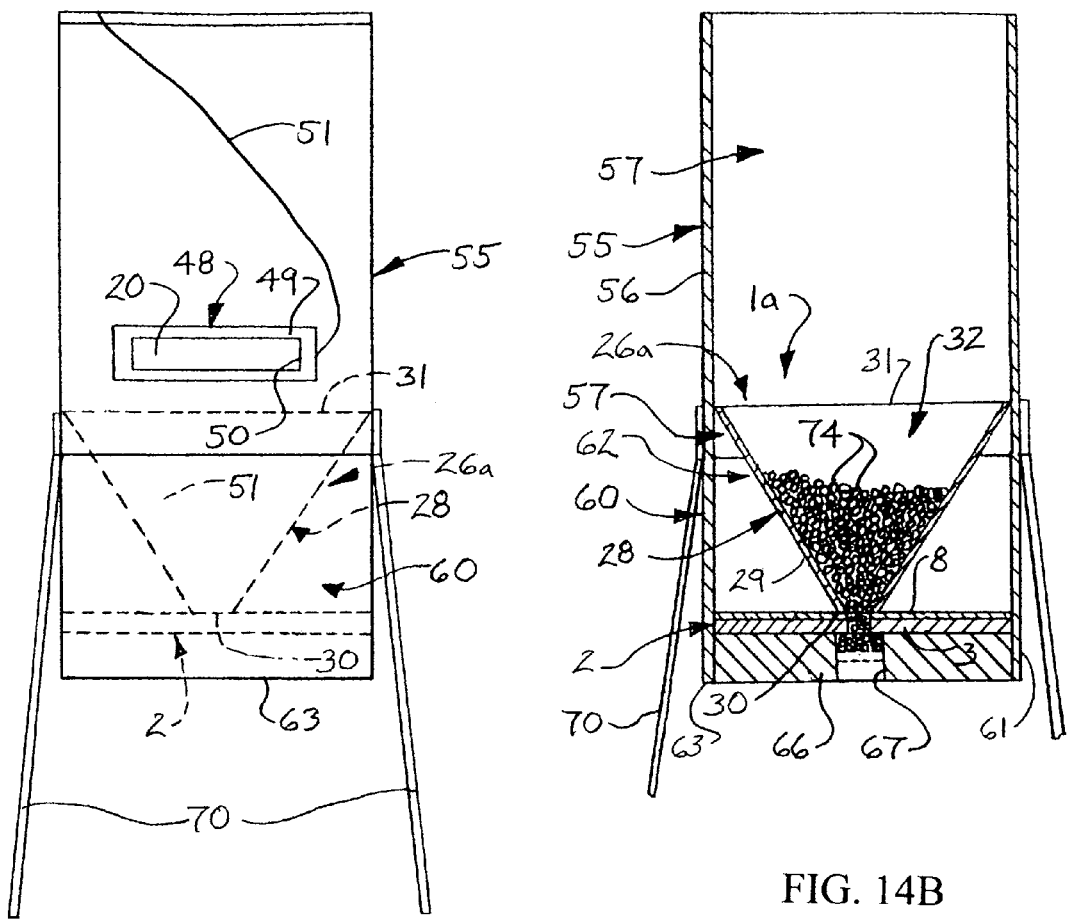
FIG. 14A is a front view of a game feeder having a cylindrical feed dispensing hopper, with the illustrative embodiment of the feed weighing insert assembly (illustrated in phantom) of FIG. 8 inserted in the game feeder.
FIG. 14B is a longitudinal sectional view of the game feeder illustrated in FIG. 14A, with an illustrative embodiment of the feed weighing insert assembly (illustrated in section) of FIG. 8 inserted in the game feeder.

Application of the assembly 1a may be as was heretofore described with respect to the assembly 1 in FIGS. 1-7. Accordingly, the insert hopper 28 of the insert body 26a is placed in the hopper interior 62 of the feed dispensing hopper 60 of the game feeder 54, with the assembly scale 2 seated at or near the bottom of the hopper interior 62 generally above the feed dispensing mechanism 66. The display unit 48 of the assembly 1a may be placed on the exterior surface of the game receptacle wall 56 of the game feeder 54 such that the display screen 20 faces outwardly from the game receptacle wall 56, as illustrated in FIG. 14. As illustrated in FIG. 13, a selected quantity of game feed pellets 74 is placed in the insert hopper interior 32 of the insert hopper 28. The assembly scale 2 weighs and displays the game feed pellets 74 in the insert hopper 28 on the display screen 20 of the display unit 48. The display screen 20 may initially be "zeroed" by depression of the zero button 22 (FIG. 6) prior to placement of the game feed pellets 74 in the insert hopper 28. The weight unit selection button 24 (FIG. 6) may be depressed to select the weight units in which the weight of the game feed pellets 74 are indicated on the display screen 20. In the example illustrated in FIG. 14, the weight of the game feed pellets 74 in the insert hopper 28 is indicated in ounces although the weight units in which the weight of the game feed pellets 74 are indicated may alternatively be pounds, grams, kilograms or other weight units. After use, the assembly scale 2 may be selectively turned off by manipulation of the power button 16 (FIG. 6). In some embodiments, a timer (not illustrated) may interface with the CPU 14 (FIG. 6) to automatically turn off the assembly scale 2 after a preset period of time. In some applications, the assembly 1a may be selectively removed from the game feeder 54 as desired. As illustrated in FIGS. 12 and 13, in some applications, the hopper wall 61 of the feed dispensing hopper 60 on the game feeder 54 may be generally conical or tapered. As illustrated in FIGS. 14A and 14B, in other applications, the hopper wall 61 of the feed dispensing hopper 60 may be generally cylindrical.

While the preferred embodiments of the disclosure have been described above, it will be recognized and understood that various modifications can be made in the disclosure and the appended claims are intended to cover all such modifications which may fall within the spirit and scope of the disclosure.

What is claimed is:

1. A feed weighing assembly, comprising:
    an assembly scale including:
        an assembly scale base having a scale opening;
        a scale plate carried by said assembly scale base and having a scale plate opening communicating with said scale opening of said assembly scale base; and
        at least one weight sensor sandwiched between said assembly scale base and said scale plate;
    a display screen interfacing with said at least one weight sensor of said assembly scale; and
    an insert body including:
        a funnel-shaped insert hopper having an insert hopper bottom edge carried by said scale plate of said assembly scale and sized and configured for placement in a game feeder and an insert hopper interior communicating with said scale plate opening of said scale plate.

2. The feed weighing assembly of claim 1 further comprising a display unit including a display unit housing having a housing opening and wherein said display screen is provided in said display unit housing.

3. The feed weighing assembly of claim 2 further comprising at least one display unit attachment magnet carried by said display unit housing.

4. The feed weighing assembly of claim 2 further comprising at least one display unit attachment fastener carried by said display unit housing.

5. A feed weighing assembly, comprising:
    an assembly scale including:
        an assembly scale base having a scale opening;
        a scale plate carried by said assembly scale base and having a scale plate opening communicating with said scale opening of said assembly scale base; and
        at least one weight sensor sandwiched between said assembly scale base and said scale plate;
    a display screen interfacing with said at least one weight sensor of said assembly scale; and
    an insert body including:
        a funnel-shaped insert hopper having an insert hopper bottom edge carried by said scale plate of said assembly scale and sized and configured for placement in a game feeder, an insert hopper top edge opposite said insert hopper bottom edge and an insert hopper interior communicating with said scale plate opening of said scale plate; and
        a cylindrical insert receptacle having an insert receptacle bottom edge carried by said insert hopper top edge of said insert hopper and an insert receptacle interior communicating with said insert hopper interior of said insert hopper.

6. The feed weighing assembly of claim 5 further comprising a display unit including a display unit housing having a housing opening and wherein said display screen is provided in said display unit housing.

7. The feed weighing assembly of claim 6 further comprising at least one display unit attachment magnet carried by said display unit housing.

8. The feed weighing assembly of claim 6 further comprising at least one display unit attachment fastener carried by said display unit housing.

9. A feed weighing assembly, comprising:
    an assembly scale including an assembly scale base, a scale plate ca rigid by said assembly scale base, at least one weight sensor between said assembly scale base and said scale plate, a scale plate opening in said scale plate and a scale base opening in said scale base and communicating with said scale plate opening;
    a display unit having a display unit housing, a housing opening in said display unit housing and a display screen in said display unit housing and interfacing with said assembly scale; and
    an insert body having a generally funnel-shaped insert hopper with an insert hopper bottom edge carried by said scale plate of said assembly scale, an insert hopper top edge opposite said insert hopper bottom edge and an insert hopper interior, said insert body sized and configured for placement in a game feeder and said insert hopper interior communicating with said scale plate opening and said scale base opening and a cylindrical insert receptacle having an insert receptacle bottom edge carried by said insert hopper top edge of said insert hopper.

10. The feed weighing assembly of claim 9 further comprising at least one display unit attachment magnet carried by said display unit housing.

11. The feed weighing assembly of claim 9 further comprising at least one display unit attachment fastener carried by said display unit housing.

12. The feed weighing assembly of claim 9 further comprising a wiring conduit in said insert body and display unit wiring connecting said display screen and said assembly scale and extending through said wiring conduit.

* * * * *